US009695777B2

(12) United States Patent
Gibble

(10) Patent No.: US 9,695,777 B2
(45) Date of Patent: Jul. 4, 2017

(54) SERIES PARALLEL WASTE HEAT RECOVERY SYSTEM

(71) Applicant: MACK TRUCKS, INC., Greensboro, NC (US)

(72) Inventor: John Gibble, Chambersburg, PA (US)

(73) Assignee: MACK TRUCKS, INC., Greensboro, NC (US)

( * ) Notice: Subject to any disclaimer, the term of this patent is extended or adjusted under 35 U.S.C. 154(b) by 192 days.

(21) Appl. No.: 14/650,374

(22) PCT Filed: Dec. 19, 2012

(86) PCT No.: PCT/US2012/070643
§ 371 (c)(1),
(2) Date: Jun. 8, 2015

(87) PCT Pub. No.: WO2014/098848
PCT Pub. Date: Jun. 26, 2014

(65) Prior Publication Data

US 2015/0308372 A1 Oct. 29, 2015

(51) Int. Cl.
*G05D 23/00* (2006.01)
*F02G 5/02* (2006.01)
(Continued)

(52) U.S. Cl.
CPC ........... *F02G 5/02* (2013.01); *F28D 21/0003* (2013.01); *F28F 27/00* (2013.01); *F01N 5/02* (2013.01)

(58) Field of Classification Search
CPC ........ F02G 5/02; F28D 21/0003; F28F 27/00; F01N 5/02
(Continued)

(56) References Cited

U.S. PATENT DOCUMENTS 4,911,110 A 3/1990 Isoda et al.
6,810,952 B2 11/2004 Ben Fredj et al.
(Continued)

FOREIGN PATENT DOCUMENTS

JP 2012140921 A 7/2012
WO 2009119185 A1 10/2009

OTHER PUBLICATIONS

1st JP Office Action mailed Aug. 2, 2016 for corresponding Japan application No. 2015-549329 translated.
(Continued)

*Primary Examiner* — Davis Hwu
(74) *Attorney, Agent, or Firm* — Martin Farrell; Michael Pruden

(57) ABSTRACT

The present invention relates to a waste heat recovery system including a first heating line, a second heating line, and a valve section. The first heating line in a working fluid circuit includes a first heat exchanger operatively connected to transfer heat energy to a working fluid. The second heating line in the working fluid circuit includes a second heat exchanger operatively connected to transfer heat to the working fluid. The valve section is selectively controllable to provide a first configuration in which the first heat exchanger and second heat exchangers are operatively connected to the working fluid circuit in parallel and a second configuration in which the first heat exchanger and second heat exchanger are operatively connected to the working fluid circuit in series.

9 Claims, 4 Drawing Sheets

(51) Int. Cl.
*F28F 27/00* (2006.01)
*F28D 21/00* (2006.01)
*F01N 5/02* (2006.01)

(58) Field of Classification Search
USPC .......................................................... 165/287
See application file for complete search history.

(56) References Cited

U.S. PATENT DOCUMENTS

| | | | | |
|---|---|---|---|---|
| 7,458,217 | B2 | 12/2008 | Kalina | |
| 7,842,121 | B2 | 11/2010 | Sanderson et al. | |
| 7,866,157 | B2 | 1/2011 | Ernst et al. | |
| 2011/0005477 | A1 | 1/2011 | Terashima et al. | |
| 2011/0226001 | A1 | 9/2011 | Kannoo et al. | |
| 2011/0284201 | A1* | 11/2011 | Soenmez ................ | B64F 1/364 165/287 |
| 2011/0308253 | A1 | 12/2011 | Ritter | |
| 2012/0292008 | A1* | 11/2012 | Goldberg ............ | F28D 21/0014 165/287 |
| 2013/0255931 | A1* | 10/2013 | Arnett ..................... | F28F 27/00 165/287 |

OTHER PUBLICATIONS

International Search Report (Mar. 12, 2013) for corresponding International App. PCT/US2012/070643.
Written Opinion (Mar. 12, 2013) for corresponding International App. PCT/US2012/070643.
Cummins Supertruck Program, "Technology and System Level Demonstration of Highly Efficient and Clean, Diesel Powered Class 8 Trucks" David Koeberlein, May 17, 2012 http://www1.eere.energy.gov/vehiclesandfuels/pdfs/merit_review_2012/adv_combustion/ace057_koeberlein_2012_o.pdf.

* cited by examiner

SERIES PARALLEL WASTE HEAT RECOVERY SYSTEM

FIELD OF THE INVENTION

The present invention relates to Waste Heat Recovery (WHR) systems coupled with waste heat from an internal combustion engine and, more specifically, to an apparatus and method for improved flexibility in the recovery of waste heat from the working fluid of a WHR.

BACKGROUND OF THE INVENTION

Waste heat recovery systems can make available for use energy in exhaust gases and other heat sources that would otherwise be lost. When incorporated in a vehicle with an internal combustion engine, waste heat recovery systems add certain advantages. For example, and not limitation, the waste heat recovery system call be designed to recover heat from exhaust gas or the EGR (exhaust gas recirculation) system, which reduces the cooling load on the engine cooling system. In addition, a waste heat recovery system can extract useful energy from the exhaust gas exiting the tail pipe or exhaust stack, which would otherwise be lost to the environment.

The amount of waste heat recovered can vary according to a number of conditions, including, for example, engine load and engine running time.

By way of example, shortly after start up or during low RPM operation less waste heat may be available for recovery than after a vehicle has warmed up or during intermediate to high RPM operation. Those of ordinary skill in the art will appreciate that a working fluid used in WHR must be heated to a minimal threshold before useful energy can be efficiently generated from the working fluid. A system designed only to efficiently make available energy during intermediate or high engine load or wasted heat operation or after a vehicle has warmed up may not be very efficient at making energy available during low engine load operation or shortly after start up.

By way of another example, after a vehicle has warmed up and during intermediate to high engine load operation a large amount of waste heat may available for recovery than shortly after start up or during low engine load operation. Those of ordinary skill in the art will appreciate that after the working fluid is heated and used make available energy in WHR that it must often times be cooled and condensed before being able to be reheated to make available more energy. A system designed only most efficiently make available energy shortly after start up or during low engine load operation may heat the working fluid to an excessive degree during high engine load operation and thus increase the duration of cooling and condensing cycle without increasing the amount of energy made available.

The present invention provides a method and apparatus for improved flexibility in the recovery of waste heat from the working fluid of a WHR.

SUMMARY OF THE INVENTION

According to one embodiment of the present invention, a waste heat recovery system includes a first heating line, a second heating line, a valve section, at least one temperature sensor, and one or more electronics. The first heating line is in a working fluid circuit and includes a first heat exchanger operatively connected to transfer heat energy to a working fluid. The second heating line is in the working fluid circuit and includes a second heat exchanger operatively connected to transfer heat to the working fluid. The valve section is in the working fluid circuit and is operatively connected to the first heating line and second heating line and selectively controllable to provide a first configuration in which the first heat exchanger and second heat exchangers are operatively connected to the working fluid circuit in parallel and a second configuration in which the first heat exchanger and second heat exchanger are operatively connected to the working fluid circuit in series. The at least one temperature sensor is operatively connected to monitor the temperature of at least one of the working fluid and the exhaust gas flow and generate an output signal representative of the temperature of at least one of the working fluid and the exhaust gas flow. The one or more electronics are operatively connected to receive the output signal from the at least one temperature sensor and responsive thereto control the configuration of the valve section.

According to another embodiment of the present invention, a waste heat recovery system includes a pump, an expander, a condenser, a first heating line, a second heating line, a valve section, at least one temperature sensor, and one or more electronics. The pump is in in a working fluid circuit and operatively connected to pump working fluid in the working fluid circuit. The expander is in the working fluid circuit and operatively connected to receive working fluid. The condenser is in the working fluid circuit operatively connected to receive the working fluid from the expander. The first heating line is in the working fluid circuit and includes a first heat exchanger operatively connected to transfer heat energy to a working fluid. The second heating line is in the working fluid circuit and includes a second heat exchanger operatively connected to transfer heat to the working fluid. The valve section is in the working fluid circuit and is operatively connected to the first heating line and second heating line and selectively controllable to provide a first configuration in which the first heat exchanger and second heat exchangers are operatively connected to the working fluid circuit in parallel and a second configuration in which the first heat exchanger and second heat exchanger are operatively connected to the working fluid circuit in series. The at least one temperature sensor is operatively connected to monitor the temperature of at least one of the working fluid and the exhaust gas flow and generate an output signal representative of the temperature of at least one of the working fluid and the exhaust gas flow. The one or more electronics are operatively connected to receive the output signal from the at least one temperature sensor and responsive thereto control the configuration of the valve section.

According to yet another aspect of the present embodiment, a method for recovering waste heat in a waste heat recovery system provided with a working fluid circuit, a pump for pumping working fluid in the working fluid circuit, an expander for receiving the working fluid, a condenser for receiving the working fluid from the expander a first heating line in a working fluid circuit including a first heat exchanger operatively connected to transfer heat energy to a working fluid, and a second heating line in the working fluid circuit including a second heat exchanger operatively connected to transfer heat to the working fluid, includes the steps of selectively controlling a valve section connected to the working fluid circuit, the first heating line, and the second heating line to provide the valve section with a first configuration in which the first heat exchanger and second heat exchangers are connected to the working fluid circuit in parallel and a second configuration in which the first heat exchanger and second heat exchanger are connected to the working fluid circuit in series, using at least one temperature sensor to monitor the temperature of at least one of the working fluid and the exhaust gas flow and generate an output signal representative of the temperature of at least one of the working fluid and the exhaust gas flow, and using one or more electronics to receive the output signal from the at least one temperature sensor and control the configuration of the valve section in response thereto.

DETAILED DESCRIPTION OF THE INVENTION

Figure 1:
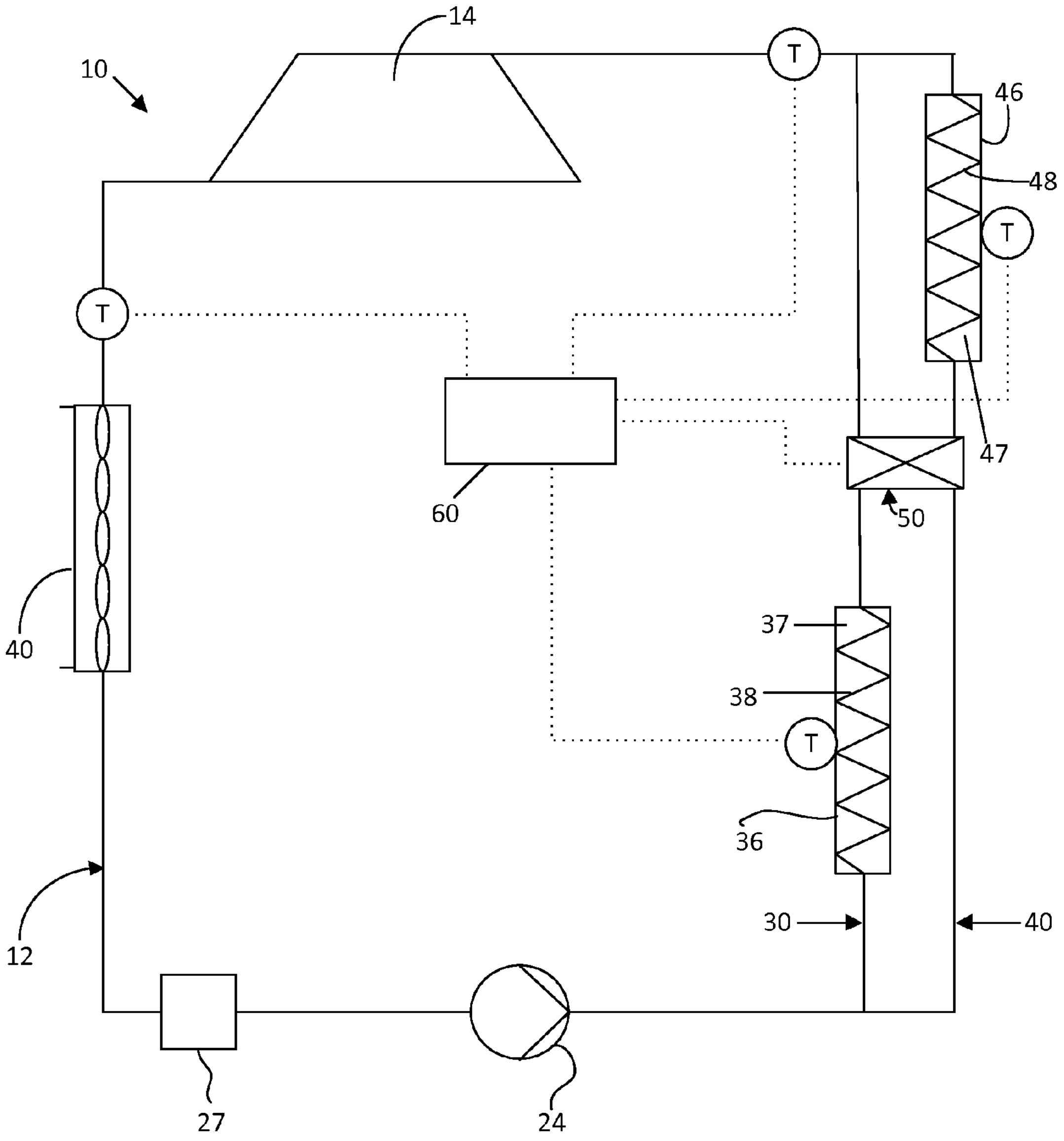
FIG. 1 depicts a schematic of a waste heat recovery system according to one embodiment.

FIG. 1 depicts an embodiment of a waste heat recovery system 10 according to one embodiment of the present invention. The waste heat recovery system 10 as shown includes a working fluid circuit 12, formed as a closed loop through which a working fluid is circulated.

An expander 14 in the working fluid circuit 12 is operatively connected to receive working fluid. Those of ordinary skill in the art will appreciate that the expander is operatively connected to be driven by working fluid to convert heat energy in the working fluid into mechanical energy, such as torque, or electricity. Those of ordinary skill in the art will appreciate that an output shaft (not shown) of the expander 14 may be connected to drive an electrical generator (not shown) or connected to the provide torque to the engine (not shown). The expander may be any device capable of recovering heat energy from a working fluid and outputting mechanical power, including, but not limited to a turbine, a scroll expander, or a thermoelectric converter.

A condenser 20 in the working fluid circuit 12 is operatively connected to receive working fluid that exits the expander 14. Those of ordinary skill in the art will appreciate that the condenser 20 cools and condenses the working fluid. A condenser cooler loop (not shown) is connected for carrying away from the condenser 20 heat transferred from the working fluid to a cooling fluid. The condenser cooler loop (not shown) may conveniently connect to the vehicle cooling system, i.e., the radiator, or another cooling system.

A pump 24 in the working fluid circuit 12 is operatively connected to pump the working fluid in the working fluid circuit 12, such as, for example, from a working fluid reservoir 27 to the heating side of the working fluid circuit 12 where the working fluid is heated.

The heating side of the working fluid circuit 12 includes a first heating line 30 and a second heating line 40. The first heating line 30 includes a first heat exchanger 36 operatively connected to transfer heat from a heat source, as at 37, to the working fluid, as at 38, located in first heat exchanger 36. The second heating line 40 includes a second heat exchanger 46 is operatively connected to transfer heat from heat source, as at 47, to the working fluid, as at 47, located in the second heat exchanger 46. The heat sources may be any heat generating or handling system associated with a vehicle having an internal combustion engine, including the engine exhaust, engine coolant system, the exhaust gas recirculation (EGR) cooler, charge air cooler, engine oil cooler, or some combination of these.

Figure 2:
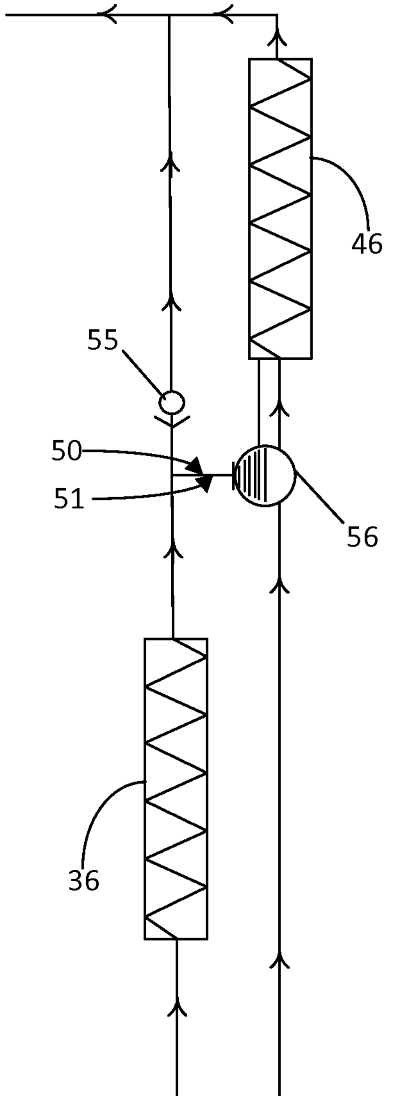
FIG. 2 depicts a schematic of a first and second heat exchanger connected in parallel in one embodiment.

According to one aspect of the present embodiment, the waste heat recovery system 10 is provided with a valve section 50 in the working fluid circuit 12 operatively connected to the first and second heating lines 30, 40. According to another aspect of the present embodiment, the valve section 50 is configured to operate the first and second heat exchangers 36, 46 in series or in parallel. As FIG. 2 depicts, the valve section 50 is selectively controllable to provide a first configuration 51 in which the first and second heat exchangers 36, 46 are operatively connected to the working fluid circuit 12 in parallel. As FIG. 3 depicts, the valve section 50 is selectively controllable to provide a first configuration 51 in which the first and second heat exchangers 36, 46 are operatively connected to the working fluid circuit 12 in series.

Figure 3:
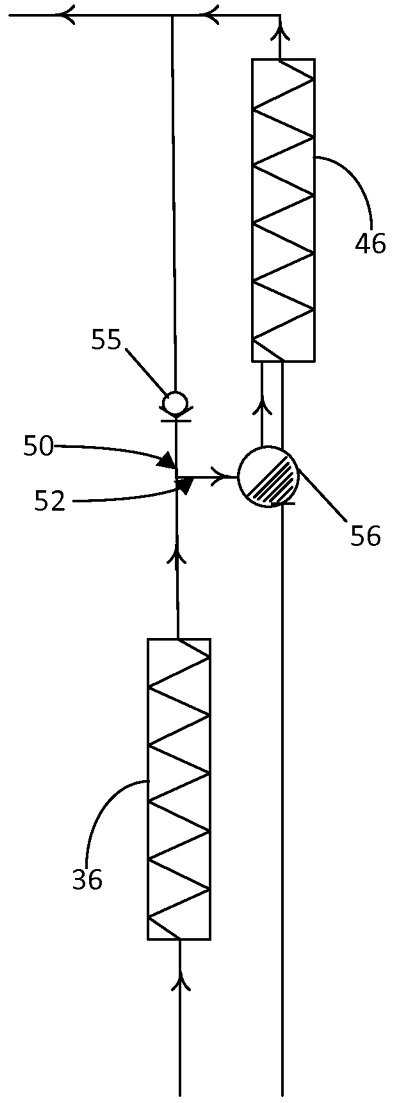
FIG. 3 depicts a schematic of a first and a second heat exchanger connected in series in one embodiment.
Figure 4:
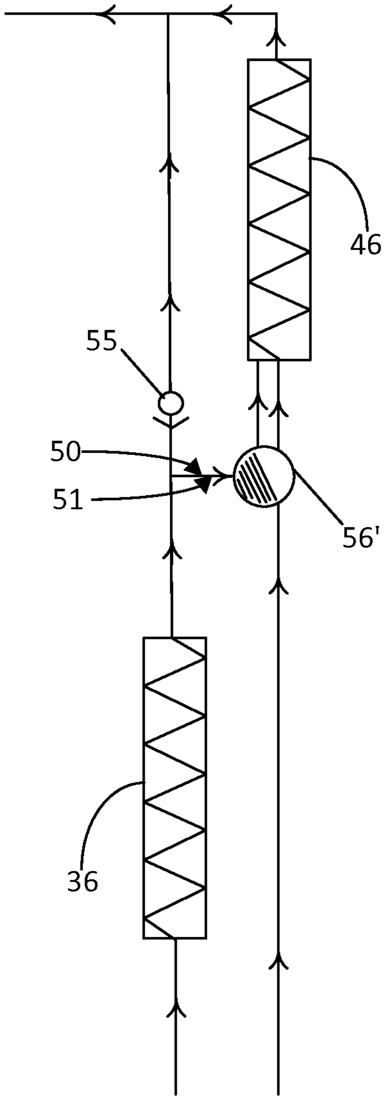
FIG. 4 depicts a schematic of a first and a second heat exchanger connected in series and in parallel in one embodiment.

As shown in FIGS. 2 and 3, the valve section 50 may include a pressure check valve 55 and flow valve 56 that regulate flow; however, those of ordinary skill in the art will appreciate that numerous valve arrangements may be provided for this purpose and that it is within the scope of the present embodiment to provide any type of valve arrangement capable of selectively operating the first and second heat exchangers 36, 46 in series or in parallel. By way of example, FIG. 4 shows an alternative embodiment utilizing a valve 56', such as, for example, and not limitation a proportional valve, provided with a first configuration (similar to FIG. 2) where the heat exchangers 36, 46 are connected to the working fluid circuit 12 in series, a second configuration (similar to FIG. 2) where the heat exchangers 36, 46 are connected to the working fluid circuit 12 in parallel, and a third configuration (FIG. 4) where the heat exchangers 36, 46 are connected to the working fluid circuit 12 in series and in parallel at the same time, whereby some of the working fluid is heated in series and some in parallel.

As shown in FIG. 1, the waste heat recovery system 10 of the present embodiment includes one or more temperature sensors T operatively connected to monitor the temperature of at least one of the working fluid or a heat source and generate an output signal representative of the temperature of at least one of the working fluid or a heat source. By way of example, and not limitation, as shown in FIG. 1, a temperature sensor T that monitors the temperature of the working fluid may be located upstream from the first and second heat exchangers 36, 46 and downstream from the expander 14. By way of another example, and not limitation, a temperature sensor T that monitors the temperature of the working fluid may be located downstream from the expander 14 and upstream from the condenser 20. By way of yet another example, and not limitation, temperature sensors T that monitor the temperature of the heat source 37 and/or the working fluid 38 may be located in the first and second heat exchangers 36, 46.

Also shown in FIG. 1, the waste heat recovery system 10 of the present embodiment includes one or more electronics 60 are operatively connected to receive the output signal from at least one temperature sensor T and in response thereto generate an output signal that controls the configuration of the valve section 50.

The present embodiment may provide a number of advantages, including reduced heat rejection requirements for the condensing circuit low load capabilities for operating conditions with less available waste heat, and improved high load capability with improved management of maximum working fluid temperature and peak thermodynamic efficiency of the systems. The present embodiment combines the advantages of parallel and series systems, with minimal hardware modifications.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention. By way of example, and not limitation, additional pre-heaters, recuperation devices, and heat exchangers may be integrated into the system. Those skilled in the art will appreciate variations from these examples and the illustrated embodiments fall within the scope of the invention.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A waste heat recovery system, comprising;

a first heating line in a working fluid circuit including a first heat exchanger operatively connected to transfer heat energy to a working fluid;

a second heating line in the working fluid circuit including a second heat exchanger operatively connected to transfer heat to the working fluid;

a valve section in the working fluid circuit operatively connected to the first heating line and second heating line and selectively controllable to provide a first configuration in which the first heat exchanger and second heat exchanger are operatively connected to the working fluid circuit in parallel and a second configuration in which the first heat exchanger and second heat exchanger are operatively connected to the working fluid circuit in series;

at least one temperature sensor operatively connected to monitor the temperature of at least one of the working fluid and an exhaust gas flow and generate an output signal representative of the temperature of at least one of the working fluid and the exhaust gas flow; and one or more electronics operatively connected to receive the output signal from the at least one temperature sensor and responsive thereto control the configuration of the valve section.

2. The waste heat recovery system according to claim 1, wherein the valve section is operatively connected the first heating line and second heating line and selectively controllable to provide a third configuration in which the first and second heat exchangers are operatively connected to the working fluid in parallel and in series.

3. A waste heat recovery system, comprising:

a pump in a working fluid circuit operatively connected to pump working fluid in the working fluid circuit;

an expander in the working fluid circuit operatively connected to receive working fluid;

a condenser in the working fluid circuit operatively connected to receive the working fluid from the expander;

a first heating line in the working fluid circuit including a first heat exchanger operatively connected to transfer heat energy to a working fluid;

a second heating line in the working fluid circuit including a second heat exchanger operatively connected to transfer heat to the working fluid;

a valve section in the working fluid circuit operatively connected to the first heating line and second heating line and selectively controllable to provide a first configuration in which the first heat exchanger and second heat exchanger are operatively connected to the working fluid circuit in parallel and a second configuration in which the first heat exchanger and second heat exchanger are operatively connected to the working fluid circuit in series;

at least one temperature sensor operatively connected to monitor the temperature of at least one of the working fluid and an exhaust gas flow and generate an output signal representative of the temperature of at least one of the working fluid and the exhaust gas flow; and one or more electronics operatively connected to receive the output signal from the at least one temperature sensor and responsive thereto control the configuration of the valve section.

4. The waste heat recovery system according to claim 3, wherein the valve section is operatively connected the first heating line and second heating line and selectively controllable to provide a third configuration in which the first and second heat exchangers are operatively connected to the working fluid in parallel and in series.

5. The waste heat recovery system according to claim 3, wherein the at least one temperature sensor monitors the temperature of the working fluid is located upstream from the first and second heat exchangers and downstream from the expander.

6. The waste heat recovery system according to claim 3, wherein the at least one temperature sensor monitors the temperature of the working fluid is located downstream from the expander and upstream from the condenser.

7. The waste heat recovery system according to claim 3, wherein the at least one temperature sensor monitors the temperature of at least one of the heat source and the working fluid in the first and second heat exchangers.

8. A method for recovering waste heat in a waste heat recovery system provided with a working fluid circuit, a pump for pumping working fluid in the working fluid circuit, an expander for receiving the working fluid, a condenser for receiving the working fluid from the expander a first heating line in a working fluid circuit including a first heat exchanger operatively connected to transfer heat energy to a working fluid, and a second heating line in the working fluid circuit including a second heat exchanger operatively connected to transfer heat to the working fluid, the method comprising the steps of selectively controlling a valve section connected to the working fluid circuit, the first heating line, and the second heating line to provide the valve section with a first configuration in which the first heat exchanger and second heat exchanger are connected to the working fluid circuit in parallel and a second configuration in which the first heat exchanger and second heat exchanger are connected to the working fluid circuit in series;

using at least one temperature sensor to monitor the temperature of at least one of the working fluid and an exhaust gas flow and generate an output signal representative of the temperature of at least one of the working fluid and the exhaust gas flow; and using one or more electronics to receive the output signal from the at least one temperature sensor and control the configuration of the valve section in response thereto.

9. The method for recovering waste heat in a waste heat recovery system according to claim 8, wherein the step of selectively controlling the valve section connected to the working fluid circuit, the first heating line, and the second heating line to provide the valve section with the first configuration in which the first heat exchanger and second heat exchanger are connected to the working fluid circuit in parallel and the second configuration in which the first heat exchanger and second heat exchanger are connected to the working fluid circuit in series, further includes selectively controlling the valve section to provide the valve section with a third configuration in which the first heat exchanger and second heat exchanger are connected to the working fluid circuit in series and in parallel.

* * * * *